United States Patent [19]

Szuba

[11] Patent Number: 4,854,929

[45] Date of Patent: Aug. 8, 1989

[54] ADHESIVE-APPLYING MACHINE

[76] Inventor: Louis Szuba, 3219 Bowmen La., Parma, Ohio 44134

[21] Appl. No.: 74,157

[22] Filed: Jul. 16, 1987

[51] Int. Cl.⁴ .............................................. F16H 7/24
[52] U.S. Cl. .................................. 493/150; 493/132; 493/147; 493/337; 118/239; 118/DIG. 3
[58] Field of Search ............... 493/110, 132, 147, 150, 493/151, 337; 118/239, DIG. 3

[56] References Cited

U.S. PATENT DOCUMENTS

| | | | |
|---|---|---|---|
| 599,615 | 2/1898 | Lederer | 493/179 |
| 1,067,867 | 7/1913 | Dormandy | |
| 1,316,120 | 9/1919 | Sutherland | 493/132 |
| 1,846,856 | 2/1932 | Francis | |
| 2,097,428 | 11/1937 | Bergstein | 118/239 |
| 2,166,126 | 7/1939 | Carruth | 493/110 |
| 2,800,873 | 7/1957 | Jalbert | |
| 2,859,727 | 11/1958 | Phin et al. | |
| 2,912,908 | 11/1959 | Crane et al. | 493/132 |
| 3,007,376 | 11/1961 | Hickin et al. | 493/128 |
| 3,135,628 | 6/1964 | Jonhson et al. | 118/D3 |
| 3,162,546 | 12/1964 | Jefferys | |
| 3,748,972 | 7/1973 | Barton | 493/128 |

Primary Examiner—Frederick R. Schmidt
Attorney, Agent, or Firm—Wayne D. Porter, Jr.

[57] ABSTRACT

An adhesive-applying machine is adapted to apply pressure-sensitive adhesive to cardboard blanks which thereafter can be folded and compressed to form a complete box. The machine includes a flat support table above which a pair of spaced, parallel conveyor belts are disposed. Preslotted, prescored cardboard blanks having laterally extending flaps are provided. The flaps are passed beneath the conveyor belts while the remaining portion of the blank passes between the conveyor belts. An adhesive-applying mechanism applies adhesive to the underside of the flaps as the blank is discharged from the table.

13 Claims, 5 Drawing Sheets

ADHESIVE-APPLYING MACHINE

BACKGROUND OF THE INVENTION

1. Field of the Invention

The invention relates to techniques for applying adhesive to portions of cardboard blanks which thereafter can be folded and compressed to form cardboard boxes.

2. Description of the Prior Art

Cardboard boxes typically are formed by slotting and scoring rectangular pieces of cardboard to form so-called blanks. The blanks are folded appropriately and "stitched," either by gluing or stapling, to form completed boxes.

Machinery suitable for forming cardboard boxes has been known for some time. An example is the patent to Dormandy, U.S. Pat. No. 1,067,867. Dormandy discloses a gluing machine which operates upon prescored blanks having four sides and a lap, or edge section. The blanks are passed through a machine where they are folded such that a portion of the blanks extends downwardly through a longitudinally extending slot formed in a flat bed. The lap is positioned at approximately the center of the machine, passing over a narrow glue wheel where glue is applied to the lap portion. The now-glued lap passes over a depression in the bed. A curved slot and a curved board cause the downwardly extending portion of the blank to be brought into contact with the underside of the remaining portion of the box such that the lap contacts the edge portion of the box. The folded box is compressed between rolls so as to complete the stitching operation.

Another machine suitable for forming cardboard boxes is disclosed in the patent to Phin et al., U.S. Pat. No. 2,859,727. A preslotted, prescored blank is folded over a mandrel and is forced into a box-like tunnel defined by bottom plates, side plates, and top plates. During their passage through the tunnel, the end portions of the blank receive glue from gluing devices. The end portions are folded inwardly, and other end portions are folded down into contact with the glued portions. Pressure then is applied to the folded end portions to set the adhesive.

Although devices such as those disclosed in the Dormandy and Phin patents are effective for the purpose of forming completed or substantially completed cardboard boxes, they do not address the problem of applying adhesive to cardboard boxes which are supplied to customers in knocked-down form for subsequent assembly. It often is important to be able to store a number of boxes in knocked-down form, the boxes being assembled only when they are needed. A particular industry where such a practice is carried out is the moving industry. Typically, hundreds of boxes will be supplied to a given customer in knocked-down condition. In this condition, the boxes can be stored compactly until they are needed, whereupon the boxes can be assembled.

A typical so-called moving box consists of a pre-scored, preslotted cardboard blank which is folded in half and "stitched" along one edge, usually by means of adhesive or staples. Upon opening a box and folding preformed flaps inwardly, a completed box will be formed. The flaps can be secured to each other by means of adhesive, staples, or tape. Moving boxes can be supplied with both top and bottom flaps, or they can be supplied with only bottom flaps, in which case a separate cover can be provided.

A particularly desirable type of moving box is one in which pressure-sensitive adhesive is applied to the flaps at the factory prior to shipment to customers. These boxes are particularly desirable because they can be assembled very quickly and easily. Unfortunately, the cost of the adhesive and the cost of applying it makes these boxes more expensive than boxes not so treated.

Known techniques for applying pressure-sensitive adhesive to the flaps of cardboard boxes are either inefficient or too expensive. The adhesive usually is applied manually by means of a paint roller, a paint brush, or by spraying. Production rates are low and labor costs are high. Although a technique for applying adhesive by machine is known, the machine in question is an expensive, converted printing press that performs a number of operations on the cardboard blanks. The expense of the machine is such that it cannot be acquired by many manufacturers of cardboard boxes. Desirably, a technique would be available that would enable boxes such as moving boxes to be treated with pressure-sensitive adhesive and yet would keep the cost of the boxes competitive with other types of boxes not so treated.

SUMMARY OF THE INVENTION

The present invention addresses the foregoing concerns and provides a new and improved technique for applying pressure-sensitive adhesive to cardboard blanks which thereafter can be folded and compressed to form a complete box. The invention is adapted to be used with cardboard blanks having a sheet-like body portion and flaps extending from one edge of the body portion, the flaps being foldable to either side of the body portion. The blanks are prescored and preslotted so that after adhesive has been applied to the flaps and the blank has been stitched, the box can be assembled merely by spacing the walls from each other, folding the flaps inwardly, and compressing the flaps against each other to cause them to adhere to each other.

A machine suitable for accomplishing the foregoing objectives includes a support table having a flat upper surface and an entrance end and a discharge end. In the preferred embodiment, the blank is oriented vertically and selected flaps are folded to one side of the body portion, while other flaps are folded to the other side of the body portion. Typically, four flaps are provided—the first and third flaps being folded to one side of the blank, while the second and fourth flaps are folded to the other side of the blank. After the flaps have been folded as described, a first conveying means engages the first and third flaps and moves them across the flat upper surface of the table from the entrance end to the discharge end. A second conveying means engages the second and fourth flaps and moves them across the flat upper surface of the table from the entrance end to the discharge end. The first and second conveying means are spaced from each other a distance that will enable the body portion of the blank to be loosely fitted between them.

An adhesive-applying means applies adhesive to the underside of the flaps as they are discharged from the table. The adhesive-applying means includes first and second rollers disposed adjacent the first and second conveying means, respectively, at the discharge end of the table at approximately the same vertical elevation as the first and second conveying means. The first and second rollers are adapted to be contacted by the upper side of the flaps. A third roller is disposed adjacent the discharge end of the table at a vertical elevation spaced from the first and second rollers. The third roller is adapted to contact the underside of the flaps. Adhesive is applied to the third roller which thereafter applies the adhesive uniformly to the underside of the flaps.

The machine according to the invention can be manufactured inexpensively. Moreover, by using the machine according to the invention, production rates can be significantly increased compared with manual adhesive-applying techniques. For example, using conventional manual adhesive-applying techniques, two workers can produce approximately 500-600 treated cardboard blanks per day. Using the present invention, those same workers can produce approximately 4000 treated blanks per day. The cost savings realized from use of the present invention are significant enough that the cost to the consumer of the more desirable treated blanks approaches that of plain blanks.

The foregoing and other features and advantages of the invention will be apparent from reviewing the following description and claims, together with the drawings.

DESCRIPTION OF THE PREFERRED EMBODIMENT

Figure 1:
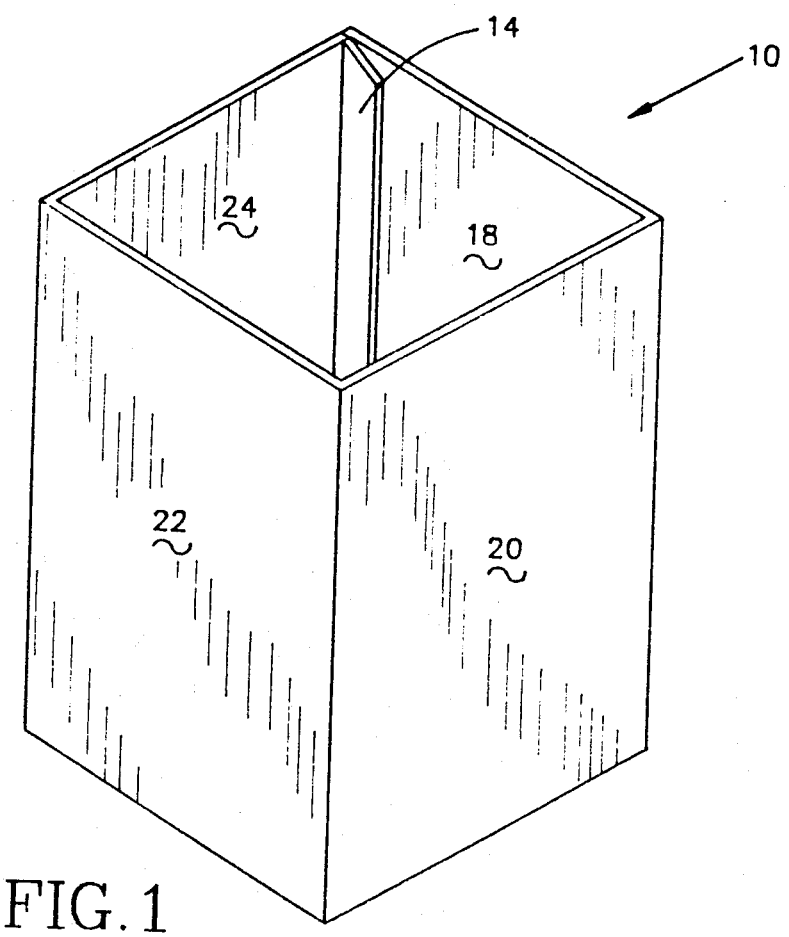
FIG. 1 is a perspective view of a typical cardboard box used in the moving industry.
Figure 2:
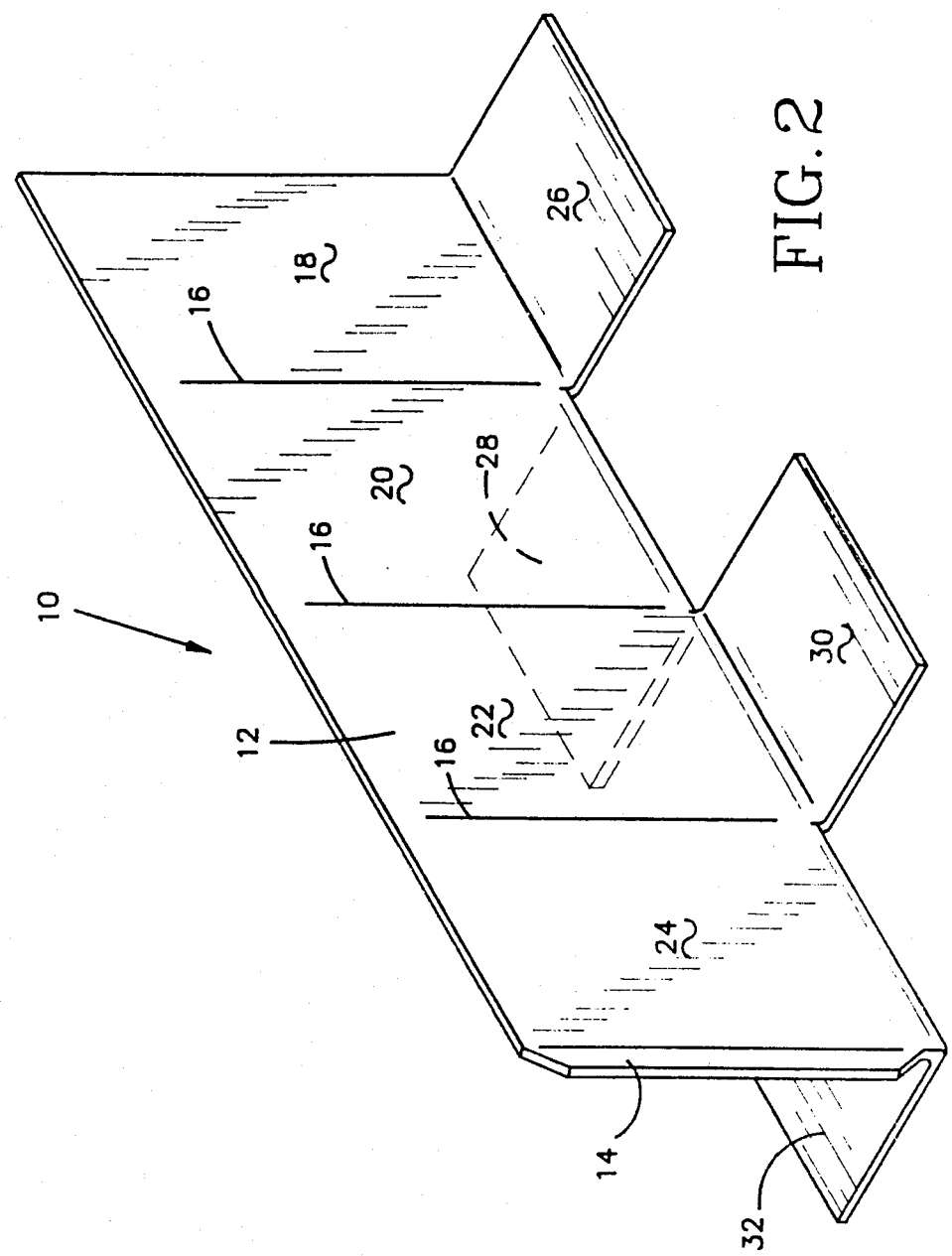
FIG. 2 is a perspective view of a preslotted, prescored cardboard blank used to make the box of FIG. 1.

Referring to FIGS. 1 and 2, a cardboard blank usable with the invention is indicated generally by the reference numeral 10. The blank 10 does not include upper flaps for purposes of simplifying the present description, but it will be appreciated that upper flaps can be, and usually are, included as part of the blank 10. The blank 10 includes a rectangular, sheet-like body portion 12 having a small tab 14 at one end. The body portion 12 is scored as indicated by the reference numeral 16 so as to divide the body portion 12 into rectangular panels 18, 20, 22, 24. Flaps 26, 28, 30, 32 extend from one edge of the body portion 12, the flap 26 being connected to the panel 18, the flap 28 being connected to the panel 20, the flap 30 being connected to the panel 22, and the flap 32 being connected to the panel 24. As shown in FIGS. 2-5, the flaps 26, 28, 30, 32 are folded alternately to opposite sides of the body portion 12, that is, the flaps 26, 30 are folded to one side of the body portion 12, while the flaps 28, 30 are folded to the other side of the body portion 12.

In FIG. 1, the panels 18, 20, 22, 24 have been folded at the score marks 16 and the tab 14 has been "stitched" to the exposed end of the panel 18. The flaps 26, 28, 30, 32 have been folded inwardly to form the bottom of the box. The stitching operation is carried out by commonly available machinery (not shown) which glues, staples, or otherwise securely connects the tab 14 to the panel 18. When the blank 10 has been folded to that position shown in FIG. 1, the flaps 26, 30 are folded inwardly toward each other, and then the flaps 28, 32 are folded inwardly toward each other such that they come into contact with the flaps 26, 30. As with the tab 14 and the panel 18, the flaps 26, 28, 30, 32 can be stitched by gluing, stapling, or by some other technique such as taping. In the moving industry, it is common for the blanks 10 to be supplied to consumers with just the tab 14 stitched to the panel 18 and with the body portion 12 supplied in a knocked-down configuration. In such a configuration, the panels 18, 20 are in surface-to-surface contact with the panels 24, 22, respectively. When the consumer wishes to form a completed box, the body portion 12 is opened to that position shown in FIG. 1 and the flaps 26, 28, 30, 32 are folded inwardly as described previously.

If desired, the underside of the flaps 26, 28, 30, 32 (as shown in FIG. 2) can be coated with a pressure-sensitive adhesive. If so coated, the adhesive surfaces will not contact each other in the knocked-down configuration and thus will not tend to adhere to each other. However, when the box is assembled, the adhesive-coated surfaces of the flaps 26, 28, 30, 32 will contact each other, whereupon a secure connection can be made by compressing the surfaces together.

Figure 3:
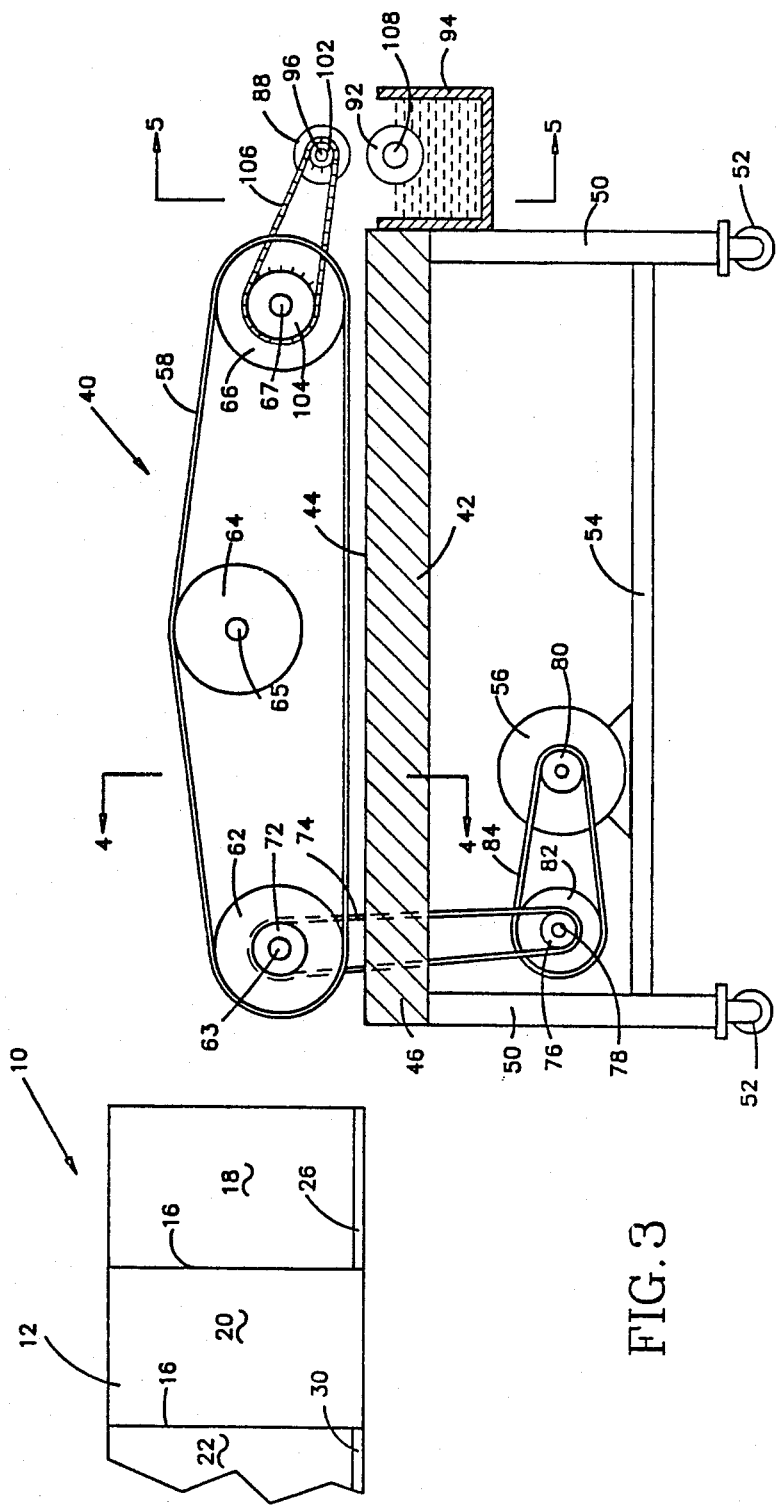
FIG. 3 is a schematic, side elevational view, partly in section, of the cardboard blank of FIG. 2 and a machine suitable for applying adhesive to portions of the blank.
Figure 4:
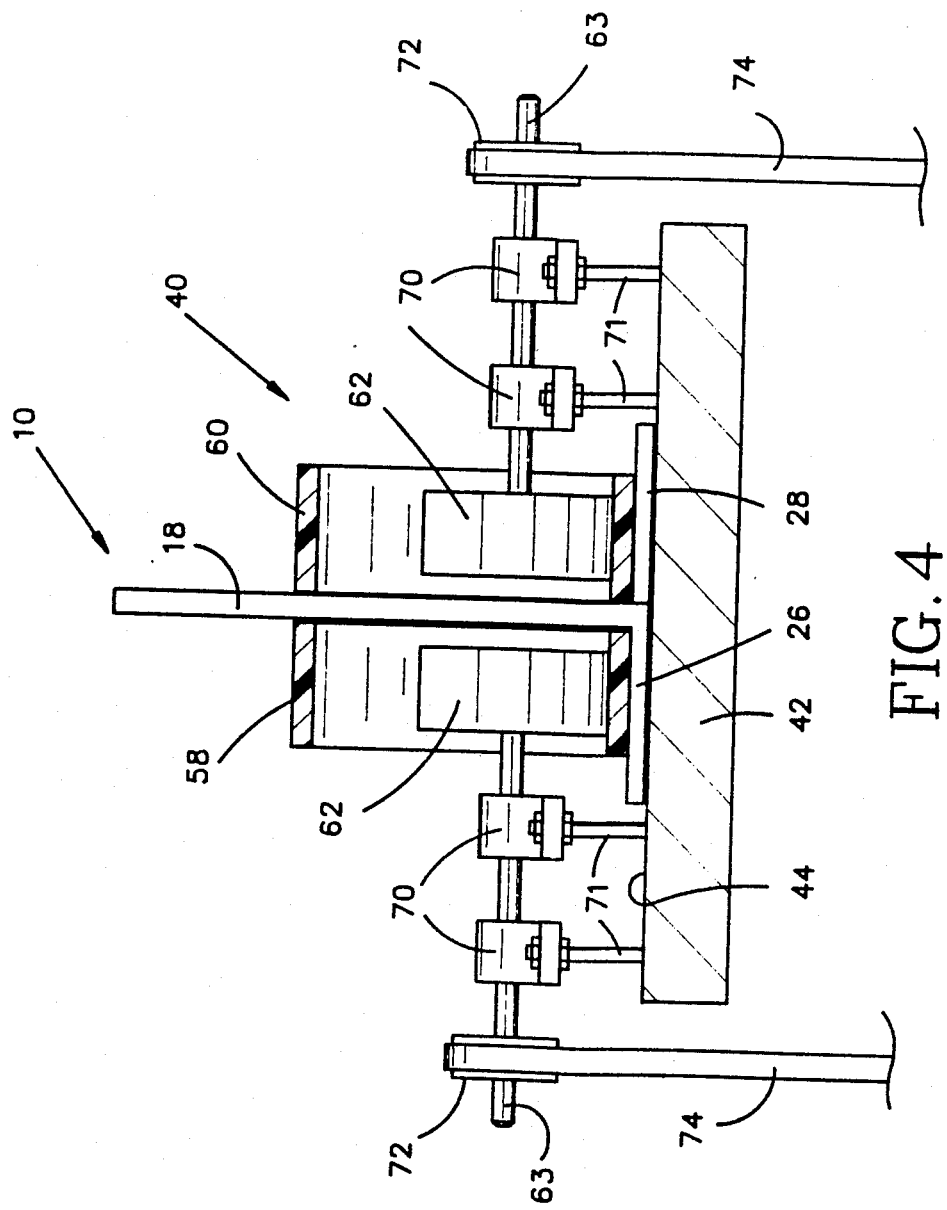
FIG. 4 is a cross-sectional view of the machine of FIG. 3, taken along a plane indicated by line 4—4 in FIG. 3.
Figure 5:
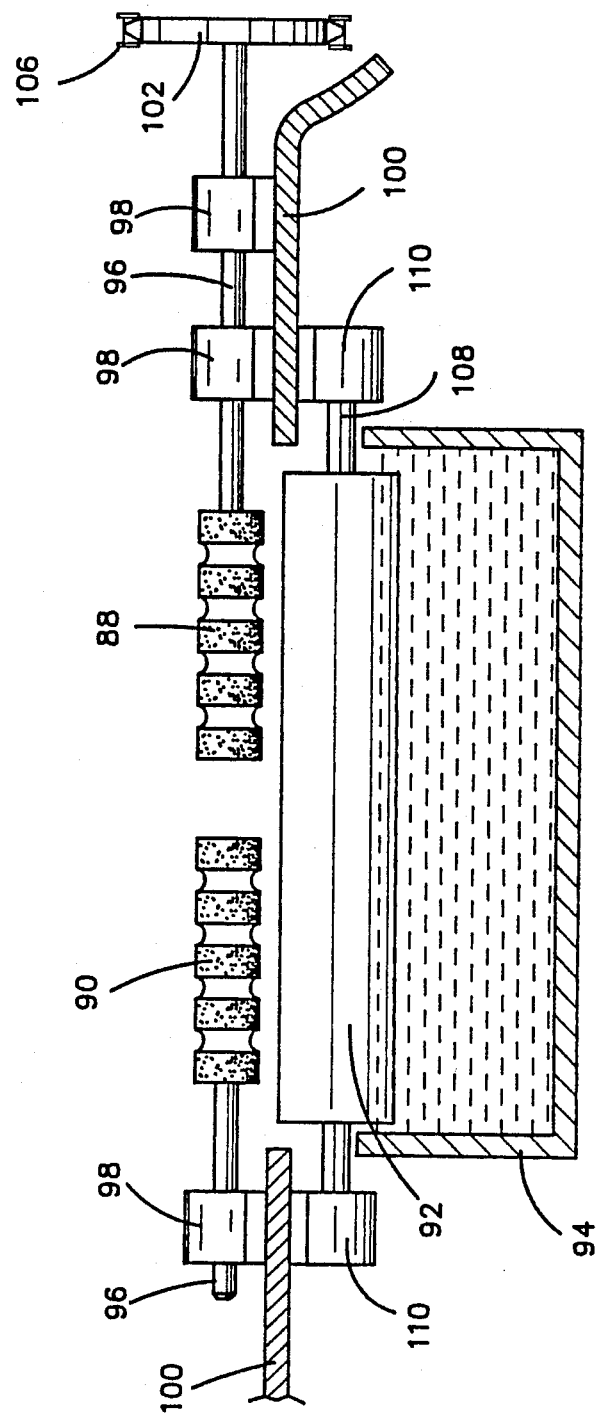
FIG. 5 is a cross-sectional view of a portion of the machine of FIG. 3, taken along a plane indicated by line 5—5 in FIG. 3.

Referring particularly to FIGS. 3-5, a machine for applying adhesive to the flaps 26, 28, 30, 32 is indicated generally by the reference numeral 40. The machine 40 includes a support table 42 having a flat upper surface 44, an entrance end 46, and a discharge end 48. The table is supported atop legs 50 having casters 52. A motor support 54 is connected to the legs 50 and supports a drive motor 56 for purposes which will be described. The machine 40 includes a first conveying means 58 in the form of a conveyor belt for engaging the flaps 26, 30 and moving them across the flat upper surface 44 from the entrance end 46 to the discharge end 48. A second conveying means 60, substantially identical to the conveying means 58, engages the flaps 28, 32 and moves them across the flat upper surface 44 from the entrance end 46 to the discharge end 48. The belts 58, 60 typically are five inches wide and are made of a flexible, rubber-like substance having a roughened outer surface.

The belts 58, 60 are supported for movement by rollers 62, 64, 66. The roller 62 is disposed toward the entrance end 46, the roller 66 is disposed toward the discharge end 48, and the roller 64 is disposed toward the middle of the table 42. The rollers 62 are supported by shafts 63 (FIG. 4) which themselves are supported for rotation by means of spaced bearings 70. The bearings 70 are vertically adjustable relative to the upper surface 44 by means of threaded rods 71 which are secured to the table 42. A pulley 72 is secured to the end of each of the shafts 63. V-belts 74 are reeved about the pulleys 72 as well as smaller pulleys 76. The pulleys 76 are secured to a shaft 78 that extends laterally across the machine 40. The drive motor 56 includes a pulley 80 that is connected to a pulley 82 by means of a V-belt 84. The pulley 82 is rigidly connected to the shaft 78. Accordingly, upon rotation of the drive motor 56, torque will be transmitted equally to both rollers 62 and thence to the conveyor belts 58, 60. The rollers 62 thus function as drive rollers.

The rollers 64 are disposed at a vertical elevation higher than the rollers 62, 66 and therefore serve as tension-adjusting, or idler, rollers. The rollers 64, 66 are supported for rotation and for vertical adjustment by shafts 65, 67, respectively, in a manner identical to the rollers 62, except that no drive mechanism is necessary for the support shafts 65, 67. The support shafts 63, 65, 67 are cantilevered so that the conveyor belts 58, 60 can be spaced apart from each other with a small gap therebetween. The conveyor belts 58, 60 are spaced a distance that will enable the body portion 12 to be loosely fitted between the conveyor belts 58, 60.

Referring particularly to FIGS. 3 and 5, an adhesive-applying means is indicated generally by the reference numeral 86. The adhesive-applying means 86 includes a first roller 88 disposed adjacent the first conveyor belt 58 at approximately the same vertical elevation as the conveyor belt 58. A second roller 90 is disposed adjacent the second conveyor belt 60 at approximately the same vertical elevation as the conveyor belt 60. A third roller 92 is disposed parallel to the rollers 88, 90 and is spaced a small distance therefrom. The roller 92 is disposed within a trough 94. In use, the trough 94 is filled with adhesive such that, upon rotation of the roller 92, adhesive will be picked up by the roller 92 and applied to the underside of the flaps 26, 28, 30, 32.

In a manner similar to the rollers 62, 64, 66, the rollers 88, 90 are supported by cantilevered shafts 96 extending laterally from bearings 98. The bearings 98 are connected to plates 100 which in turn are connected to the discharge end 48. The bearings 98 are vertically adjustable relative to the plates 100 by means of shims or washers (not shown). A toothed sprocket 102 is secured to the end of each of the shafts 67. A toothed sprocket 104 is secured to the end of each of the shafts 96, and a chain 106 is reeved about each of the sprockets 102, 104. The sprockets 102, 104 and the chains 106 provide a positive drive for the rollers 88, 90.

The rollers 88, 90 preferably are made of a hard, non-absorbent material such as brass. The rollers 88, 90 also have a knurled, or roughened outer surface. The roller 92 is supported for rotation by a shaft 108 extending completely through the roller 92. The shaft 108 is supported at its ends by bearings 110 that are connected to the plates 100. The lateral extent of the roller 92 is approximately that of the rollers 88, 90 taken together. The roller 92 preferably is made of a relatively soft, adhesive-absorbent material. It has been found that two conventional seven-inch paint rollers placed end-to-end on the shaft 108 function adequately as the roller 92.

Adhesive used in the trough 94 can be any commercially available pressure-sensitive adhesive. A suitable adhesive can be obtained from General Latex-Chemical Corp./OH, Ashland, Ohio 44805. The adhesive can be supplied to the trough 94 manually or, preferably, by means of a storage reservoir (not shown) connected to one of the plates 100. The storage reservoir can be manually operated or it can be float-controlled. Suitable adhesive-dispensing mechanisms are commercially available and further description is unnecessary.

Operation

The machine 40 is operated as follows:

1. The rollers 62, 64, 66 are vertically adjusted to produce a desired uniformed spacing between the underside of the belts 58, 60 and the upper surface 44.

2. The vertical spacing of the rollers 88, 90, 92 is adjusted so as to place the space between the rollers 88, 90 and the roller 92 in horizontal alignment with the space between the belts 58, 60 and the upper surface 44.

3 A blank 10 is oriented such that the body portion 12 is vertically disposed.

4. The flaps 26, 30 are folded to one side of the body portion 12, while the flaps 28, 32 are folded to the other side of the body portion 12.

5. The motor 56 is activated. The speed of the motor 56 and the dimensions of the various pulleys are selected so that the linear speed of the belts 58, 60 is about 2.85 feet/second.

6. The leading edge of the body portion 12 is fitted between the spaced conveyor belts 58, 60 and the flap 26 is inserted under the conveyor belt 58 at the entrance end 46. If the belt 58 is spaced properly above the upper surface 44, the flap 26 will be engaged by the conveyor belt 58, whereupon the blank 10 will be drawn through the machine 40.

7. As the various flaps 26, 28, 30, 32 are engaged by the conveyor belts 50 and 60, the blank 10 will be driven positively and squarely through the machine 40. As the flaps 26, 28, 30, 32 pass through the rollers 88, 90, 92, the upper surfaces of the flaps 26, 28, 30, 32 will be contacted by the rollers 88, 90 so as to prevent the flaps 26, 28, 30, 32 from flexing. Simultaneously, the adhesive-containing roller 92 will contact the underside of the flaps 26, 28, 30, 32, thereby applying a thin, uniform coating of adhesive to the surfaces thus contact.

8. As the blank 10 is discharged from the machine 40, the blank 10 is placed upon a rack (not shown) for a short time so that the adhesive can dry.

9. After the adhesive has dried, the blank 10 can be run through a stitching machine where the tab 14 can be attached to the panel 18.

As will be apparent from the foregoing description, the present invention discloses a technique for applying adhesive to cardboard blanks that enables production speed to be greatly increased compared with manual adhesive-applying techniques. The machine according to the invention is exceedingly inexpensive, reliable, and easy to operate. The various components of the machine can be adjusted easily and, if repair or replacement is necessary, repairs can be accomplished using commonly available tools.

Although the invention has been described in its preferred form with a certain degree of particularity, it will be understood that the various components of the machine and their arrangement can be modified within the true spirit and scope of the invention as hereinafter claimed. It is intended that the patent shall cover, by suitable expression in the appended claims, whatever degree of patentable novelty exists in the invention disclosed.

What is claimed is:

1. A machine for applying adhesive to a cardboard blank having a sheet-like body portion and flaps extending from one edge of the body portion, selected flaps being foldable to one side of the body portion and other flaps being foldable to another side of the body portion, comprising:

a support table having a flat upper surface and an entrance end and a discharge end;

first conveying means for engaging selected flaps and moving them across the flat upper surface from the entrance and to the discharge end;

second conveying means for engaging other flaps and for moving them across the flat upper surface from the entrance end to the discharge end, the second conveying means being spaced from the first conveying means a distance that will enable the body portion of the blank to be loosely fitted between the first and second conveying means;

adhesive-applying means disposed at the discharge end of the table for applying adhesive to the flaps, the adhesive-applying means including a first roller disposed adjacent the first conveying means at the discharge end of the table and at approximately the same vertical elevation as the first conveying means, the first roller adapted to be contacted by selected flaps;

a second roller disposed adjacent the second conveying means at the discharge end of the table and at approximately the same vertical elevation as the second conveying means, the second roller adapted to be contacted by other flaps;

a third roller disposed adjacent the discharge end of the table and at a vertical elevation spaced from the first and second rollers, the third roller adapted to contact the flaps, the third roller having a length such that it extends directly below the first and second rollers in order that the workpiece may receive adhesive from the third roller while the first and second rollers contact the selected flaps and other flaps, respectively; and means for applying adhesive to the third roller.

2. The machine of claim 1, wherein the first conveying means is in the form of a first conveyor belt spaced from the upper surface of the table, the first conveyor belt being spaced from the table a distance that will enable selected flaps of the blank to be fitted tightly between the first conveyor belt and the upper surface of the table.

3. The machine of claim 2, wherein the second conveying means is in the form of a second conveyor belt spaced from the upper surface of the table, the second conveyor belt being spaced from the upper surface of the table a distance that will enable other flaps of the blank to be fitted tightly between the second conveyor belt and the upper surface of the table.

4. The machine of claim 3, wherein the first and second conveyor belts are supported for movement by pulleys, the pulleys being supported by cantilevered shafts.

5. The machine of claim 1, wherein the first and second rollers are made of a hard, non-absorbent material.

6. The machine of claim 5, wherein the first and second rollers have a roughened outer surface.

7. The machine of claim 1, wherein the third roller is a conventional paint roller.

8. The machine of claim 1, wherein the means for applying adhesive to the third roller is an adhesive-containing trough within which the third roller is disposed.

9. A machine for applying adhesive to a cardboard blank having a sheet-like body portion and flaps extending from one edge of the body portion, selected flaps being foldable to one side of the body portion and the other flaps being foldable to the other side of the body portion, comprising:

a support table having a flat upper surface and an entrance end and a discharge end;

a first conveyor belt disposed above the upper surface of the table, the first conveyor belt being spaced from the table a distance that will enable selected flaps of the blank to be fitted tightly between the underside of the first conveyor belt and the upper surface of the table;

a second conveyor belt disposed above the upper surface of the table, the second conveyor belt being spaced from the upper surface of the table a distance that will enable other flaps of the blank to be fitted tightly between the underside of the second conveyor belt and the upper surface of the table;

the first and second conveyor belts being supported for movement by pulleys, the pulleys being supported by cantilevered shafts;

a first roller disposed adjacent the first conveyor belt at the discharge end of the table and at approximately the same vertical elevation as the first conveyor belt, the first roller adapted to be contacted by selected flaps;

a second roller disposed adjacent the second conveyor belt at the discharge end of the table and at approximately the same vertical elevation as the second conveyor belt, the second roller adapted to be contacted by other flaps;

a third roller disposed adjacent the discharge end of the table and at a vertical elevation spaced from the first and second rollers, the third roller adapted to contact the underside of the flaps, the third roller having a length such that it extends directly below the first and second rollers in order that the workpiece may receive adhesive from the third roller while the first and second rollers contact the selected flaps and other flaps, respectively; and means for applying adhesive to the third roller.

10. The machine of claim 9, wherein the first and second rollers are made of a hard, non-absorbent material.

11. The machine of claim 10, wherein the first and second rollers have a roughened outer surface.

12. The machine of claim 9, wherein the third roller is a conventional paint roller.

13. The machine of claim 9, wherein the means for applying adhesive to the third roller is an adhesive-containing trough within which the third roller is disposed.

* * * * *